(12) United States Patent
Stiens et al.

(10) Patent No.: US 6,342,981 B1
(45) Date of Patent: Jan. 29, 2002

(54) ZERO-DISPLACEMENT PHASE RETARDER DEVICE AND METHOD

(75) Inventors: Johan Stiens, Brussels (BE); Vladimar Kotov, Mosow Region (RU)

(73) Assignee: Rose Research, LLC, Dallas, TX (US)

( * ) Notice: Subject to any disclaimer, the term of this patent is extended or adjusted under 35 U.S.C. 154(b) by 0 days.

(21) Appl. No.: 09/399,706

(22) Filed: Sep. 21, 1999

(51) Int. Cl.[7] .............................. G02B 5/04; B23K 26/00
(52) U.S. Cl. ...................... 359/837; 359/831; 359/669; 359/483; 359/355; 219/121.73; 219/121.77; 219/121.78; 219/121.82
(58) Field of Search ................................. 359/350, 354, 359/355, 356, 668, 669, 670, 671, 831, 833, 837, 483, 485, 494, 495, 496, 497, 499, 640; 219/121.73, 121.75, 121.76, 121.77, 121.78, 121.79, 121.8, 121.82

(56) References Cited

U.S. PATENT DOCUMENTS

| 2,406,798 A | * | 9/1946 | Burroughs |  |
|---|---|---|---|---|
| 3,477,788 A | * | 11/1969 | Newcomer |  |
| 3,807,837 A |  | 4/1974 | Schmidt et al. |  |
| 3,871,750 A | * | 3/1975 | Mecklenborg |  |
| 4,514,047 A |  | 4/1985 | Haskal et al. | 350/394 |
| 4,536,063 A |  | 8/1985 | Southwell | 350/394 |
| 4,556,292 A | * | 12/1985 | Mathyssek et al. |  |
| 4,580,879 A | * | 4/1986 | Wilson |  |
| 4,643,538 A | * | 2/1987 | Wilson |  |
| 4,747,667 A | * | 5/1988 | Tanaka et al. |  |
| 4,822,974 A |  | 4/1989 | Leighton |  |
| 4,917,461 A |  | 4/1990 | Goldstein | 350/394 |
| 4,930,878 A |  | 6/1990 | Bergner et al. | 350/394 |
| 5,274,489 A | * | 12/1993 | Smith et al. | 359/837 |
| 5,440,424 A | * | 8/1995 | Wu et al. | 359/496 |
| 5,751,482 A |  | 5/1998 | Challener, IV |  |
| 6,038,076 A | * | 3/2000 | Bouzid et al. | 359/640 |

FOREIGN PATENT DOCUMENTS

| DE | 19741029 A1 |  | 9/1997 | .......... B23K/26/02 |
|---|---|---|---|---|
| EP | 0470555 | * | 2/1992 | ................. 359/837 |
| FR | 2561003 | * | 9/1985 | ................. 359/837 |
| GB | 2005044 | * | 4/1979 | ................. 359/837 |
| GB | XP00159474 |  | 12/1991 | ............ G02B/5/30 |
| WO | WO 90/15357 |  | 12/1990 | .......... G02B/27/28 |

* cited by examiner

Primary Examiner—Ricky D. Shafer
(74) Attorney, Agent, or Firm—Slater & Matsil, LLP

(57) ABSTRACT

An optical device includes a substrate 60 and three prisms 10, 20 and 30. The first prism 10 is disposed adjacent to an upper surface of the substrate 60. An incoming beam aperture 65 is positioned adjacent a first surface 12 of the first prism 10, the first surface 12 extending away from the upper surface of the substrate 60. The second prism 30 is disposed adjacent to the upper surface of the substrate 60 and is spaced from the first prism 10 by a first distance. The third prism 20 is also disposed adjacent to the upper surface of the substrate 60. The third prism 20 may be spaced from the second prism 30 by the same first distance. An outgoing beam aperture 66 is positioned adjacent a first surface 22 of the third prism 20. The substrate 60 has phase changing reflective surfaces 40 and 50 along the upper surface between the first prism 10 and the second prism 30 and between the second prism 30 and the third prism 20.

34 Claims, 7 Drawing Sheets

LOWEST CURVE=>λ=0.633 μm    HIGHEST CURVE λ=14μm

ZERO-DISPLACEMENT PHASE RETARDER DEVICE AND METHOD

FIELD OF THE INVENTION

The present invention relates generally to optical devices and more particularly to a zero-displacement phase retarder device and method.

BACKGROUND OF THE INVENTION

Phase retarders are optical elements designed to change the phase shift between the two orthogonal polarization components of a polarized optical beam, without affecting their relative amplitude. These elements are primarily used in the synthesis and analysis of the polarization state of light.

A very common application of phase retarders is the conversion of linearly polarized light into circularly polarized light. Introducing a 90°-phase shift between the two orthogonal polarization components does this. The 90°-phase retarders (also called quarter-wave plate) are applied as optical isolators used in laser interferometry, ellipsometry, electro-optic modulators and so on.

In material processing applications, such as cutting and drilling, circularly polarized light is preferred over linearly polarized light because it makes the cutting and drilling isotropic, that is independent of the cut direction. Holes that are drilled with circularly polarized light are circular, whereas those drilled with linear polarized light will be elliptical.

In general, there are several mechanisms to obtain the retardation effect. These mechanisms include the propagation of light through a linear birefringent medium, total internal reflection, reflection at the Brewster angle, reflection by a film-coated substrate and others. Reference can be made to R. M. A. Azzam and N. M. Bashara, "Ellipsometry and Polarized Light", Chapter 5 "Instrumentation and Techniques of Ellipsometry", Ed. North-Holland Publishing Company (1977) for details regarding prior art mechanisms. Among these known mechanisms, the first one is generally the most attractive because the retarder does not disturb the direction of light propagation. It only changes the polarization state.

The simplest retardation plate is a uniaxial crystal cut to include the crystalline optic axis direction. If the thickness of the plate is "d", the difference in speed between the ordinary and extraordinary components leads to a cumulative phase shift $\delta$ equal to $(2\pi/\lambda)(n_o-n_e) \cdot d$, where "$\lambda$" is the free-space wavelength, and $n_o$ and $n_e$ are the ordinary and extraordinary refractive indexes of the crystal, respectively. For the mid- and far-IR region (e.g., from 2–20 $\mu$m), inexpensive commercially available crystals with a large difference between $n_o$ and $n_e$ do not exist.

In the mid- and far-IR region, one prefers to produce phase retarders (in particular 90°-phase shifters) based on the reflection of light from a metallic surface. These retarders are typically made on a copper substrate mirror coated with a dielectric multilayer structure with layer thicknesses designed to function as a quarter-wave plate at a particular wavelength, i.e. to transform the linearly polarized light into circularly polarized.

Unfortunately, the optical arrangement used to obtain a circularly polarized beam from a linear polarized beam completely disturbs the setup that was aligned for the linearly polarized beams. To correct the setup, two angles must be correctly set. First, it is necessary to have an angle of incidence equal to 45°, and second, the plane of polarization of the incident beam must be 45° with respect to the plane of incidence. Any changes or corrections needed to be made to the phase leads to the changes in the direction of light propagation. Hence such element is very impractical for using in an optical setup because any required change in the polarization or its orientation, drastically disturbs the optical arrangement.

Transmissive phase retarders have the advantage that they do not change the plane of propagation. Such phase retarders are the subject of U.S. Pat. Nos. 4,536,063 and 4,514,047. Because the multi-layer phase retarders do not operate under normal incidence, they induce a lateral shift of the laser beams after insertion of the element. This lateral shift is different for each wavelength. Hence two laser beams originally aligned will be shifted with respect to each other after passing though the phase retarder.

In U.S. Pat. No. 4,930,878 improvements are suggested for the well known Fresnel Rhombus. The Fresnel Rhombus is described by J. M. Bennett, Appl. Opt. 9 (1970) 9, pages 2123–2129, September 1970. It is clear that the prismatic element from the '878 patent also induces lateral shifts for each different wavelength.

In the invention described in U.S. Pat. No. 4,917,461 the phase retarder is inserted orthogonal to the beam propagation. This feature provides an advantage as it simplifies the arrangement procedure. But this phase retarder has the disadvantage that the axis of the optical beam needs coincide with the optical axis of the polarizing element. If not, the beams will be displaced in the vertical direction. Any vibration in the room of the optical arrangement will disturb the propagation direction of the laser beams after passing through the phase retarder.

U.S. Pat. No. 4,514,047 discloses an on-axis achromatic quarterwave retarder prism. This prism has a shape similar to a dove prism with three internal reflections and is designed to have the emerging light beam on the same axis as the entering light beam only when the light beam is incident along the optical axis. In all other cases the outgoing beam is only collinear but displaced with respect to the incoming beam. This patent claims that the device operates over a wide range of wavelengths of light.

SUMMARY OF THE INVENTION

The present invention provides optical components that are advantageous over the optical components of the prior art. In one aspect, the invention is directed to an optical arrangement aligned for multiple wavelengths where the insertion of a phase retarder in the beam propagation path does not affect the alignment of the multiple laser beams. More in particular this embodiment of the invention relates to applications where a polarization change of an invisible laser beam is required when this beam is already aligned with a visible laser beam.

In one aspect, the present invention discloses a zero displacement phase retarder that includes three prisms and two reflecting surfaces. These elements induce a phase shift of one component of polarized light with respect to the orthogonal component. In the preferred embodiment, the three prisms are mounted with their flat bases on a substrate surface that includes the two phase-shifting reflectors. The two outer prisms have a flat surface perpendicular to the beam propagation path. The third surface makes a predefined angle with respect to the surface normal to the incoming (or outgoing) beam. The central prism can be considered as the combination of the two outer prisms unified at their flat surface.

In the preferred embodiment, the prisms are at an equal predefined distance from each other. The aperture of the phase retarder is only slightly smaller than the prisms. Any multi-color beam incident within the aperture of the optical element will leave the element without any lateral displacement.

One application where the present invention has particular use is in laser cutting and laser drilling. In these applications, when linearly polarized light is converted into circularly polarized light, the cutting efficiency decreases along the direction that is coincident with the originally linearly polarized state but increases along the orthogonal direction. Hence when different applications are to be executed with the same laser processing tools, it is interesting to switch effectively between linearly and circularly polarized light. The preferred embodiment of the present invention provides the benefit that one can insert the phase retarder into the optical setup without affecting the propagation paths of the visible and invisible laser beams.

The preferred embodiments of the present invention have other advantages over prior art devices and methods. In general, prior art phase retarders effect the propagation path once they are inserted in the optical arrangement and hence every new alignment is very time consuming. One of the advantages of the present invention is that the phase retarder can be used for visible and invisible light. After the phase retarder is included in the optical arrangement, the "visible" and "invisible" light beams first remain coincident and second do not show any lateral displacement. It is also advantageous that the device does not have an optical axis and therefore as long as the beam enters the device orthogonally, vertical or horizontal displacements will not affect the operation.

By combining two phase changing reflectors in a single optical device, whereby each has a different central operation wavelength, the degree of achromaticity of such optical device is extended with respect to an optical device comprising one single phase changing reflector.

BRIEF DESCRIPTION OF THE DRAWINGS

The above features of the present invention will be more clearly understood from consideration of the following descriptions in connection with accompanying drawings in which:

FIG. 2b shows a more detailed view of the propagation of the laser beams along the phase retarder of FIG. 2a;

FIG. 3 shows the design plots and tolerances for the phase retarder of FIG. 2a;

DETAILED DESCRIPTION OF THE EMBODIMENTS

The making and use of the presently preferred embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

Figure 1:
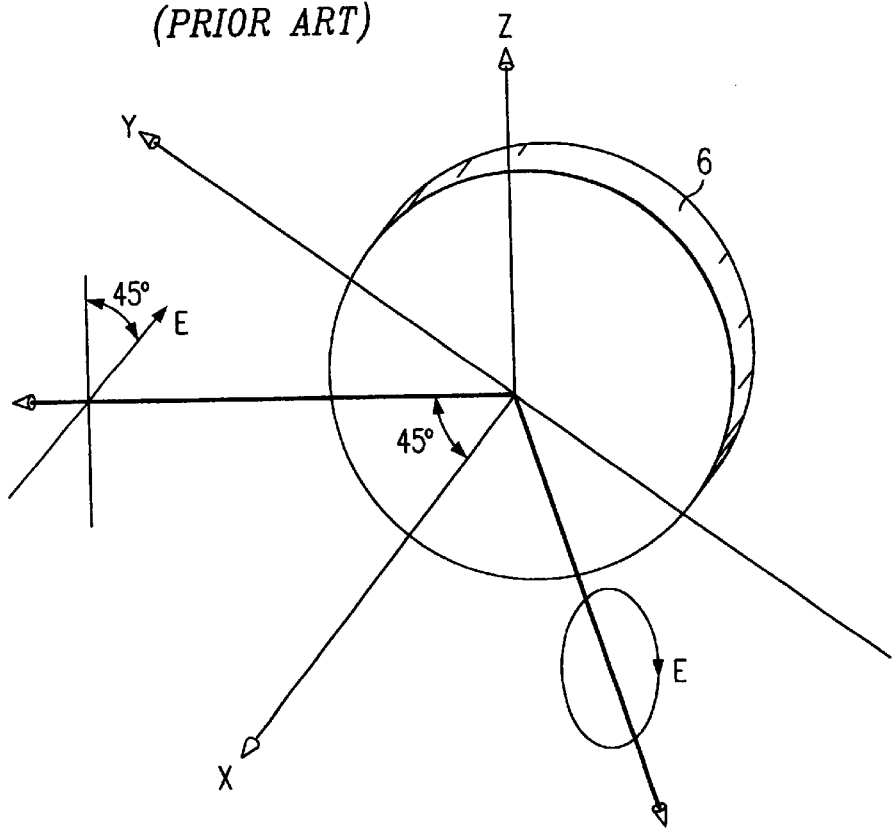
FIG. 1 schematically shows the propagation path of light when using a prior art quarter wavelength (λ/4) phase retarder.

FIG. 1 illustrates the optical arrangement of a prior art 90°-phase retarder 6 that operates in reflection mode at mid- or far-infrared (IR) wavelengths. Mid and far-IR wavelengths typically range from 2–20μm. In this device, the IR-beam is aligned to the visible laser beam. The operation principles of this device lead to the adverse change of the propagation path of the light beams. Any adjustment of the retarder results in a misalignment of all the other optical components of the setup. If another polarization state of the infrared beam is required, the complete setup needs to be rearranged. These are essential drawbacks of this very popular phase retarder.

Figure 2A:
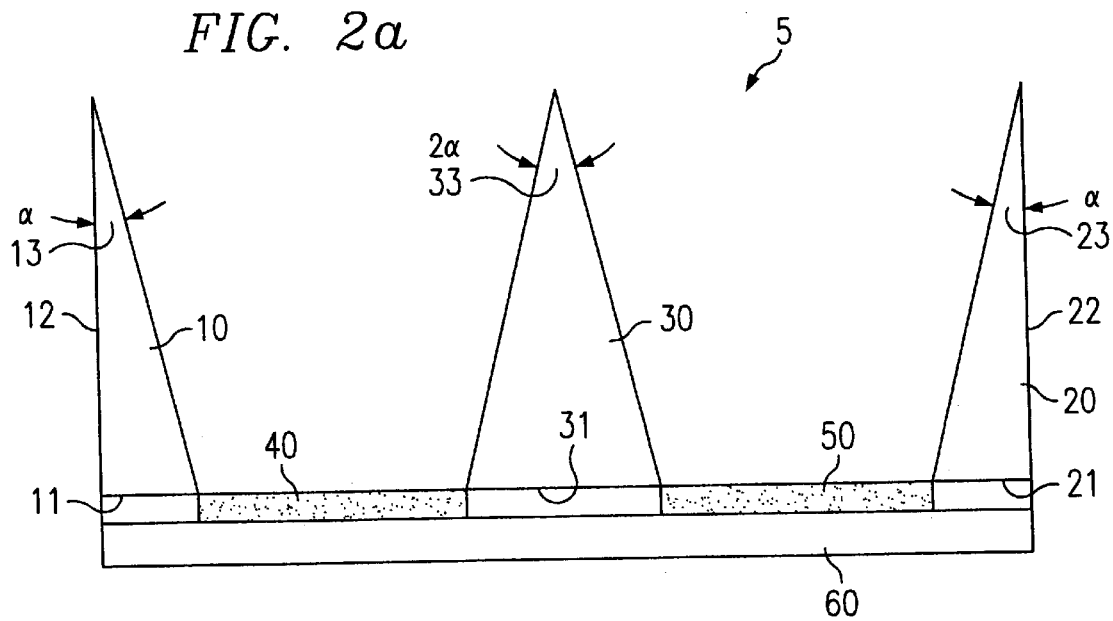
FIG. 2a shows a side view of the geometrical construction of the phase retarder comprising three prisms and two phase-shifting mirrors.

The preferred embodiment of the present invention, on the other hand, is a phase retarder that does not affect the propagation paths of the two light beams when it is inserted in or removed from the optical setup. The side view of the preferred embodiment phase retarder 5 is illustrated in FIG. 2a.

In a first embodiment, the optical element 5 comprises three prisms 10, 20 and 30 and two phase changing reflecting surfaces 40 and 50 on a substrate 60. The prisms 10, 20 and 30 are fixed to the upper surface of substrate 60 with their flat surfaces 11, 21 and 31, respectively. In this embodiment, the two outer prisms 10 and 20 are substantially identical and are positioned with their second flat surface 12 and 22 orthogonal to the propagation path of the laser beams 1 and 2 (see FIG. 2b).

The top angles 13 and 23 of both outer prisms 10 and 20 are substantially equal to an angle α. The angle a can typically range from about 10 to about 20 degrees and is preferably about 17 degrees for high (n≈2.4–2.5) refractive index prism materials and from about 20 to about 40 degrees, preferably about 35 degrees for low (n≈1.4–1.5) refractive index prism materials. The inner prism 30 has a top angle 33, which is preferably double the angle α of the outer prisms 10 and 20.

It is noted that these angles are applicable to two typical ranges of refractive index values. In fact, many different refractive index values are applicable so that these angle values may vary greatly. Accordingly, it should be understood that the angle values are not critical. Rather, the angles are determined from a practical technical point of view. It is also noted that it is possible to include different materials in the optical device. It means two prisms 10 and 20 could be made from material A and the third prism 30 from material B. In this case, the top angle the prism 30 would not be equal to twice the top angle of the other prisms 10 and 20.

The prisms 10, 20 and 30 are preferably made from a material that is transparent for both laser beams. In the preferred embodiment the prisms 10–30 are all made from ZnSe but other materials such as CaF$_2$, Sapphire, NaCl, KBr, KJ, $Na_3AlF_6$, $LaF_3$, $MgF_2$, $ThF_4$, $SiO_2$, $Al_2O_3$, $Y_2O_3$, MgO, $CeO_2$, $ZrO_2$, SiO, ZnS, CdS could also be used. The substrate 60 is typically made from a material such as Cu, Si, Ge, Al, or GaAs, and the coatings can be designed from the same materials as in the prism materials list, either alone or in combination. Typical values for the thickness of these layers are submicron and can be easily designed by persons skilled in the art.

This fabrication of an optical device 5 is fairly straightforward, providing an advantage that the cost can be kept low. After the appropriate substrate 60 has been selected, coatings can be added using deposition or other techniques that are well known in the art. The prisms 10–30 can then be mounted using any suitable adhesive.

Figure 2B:
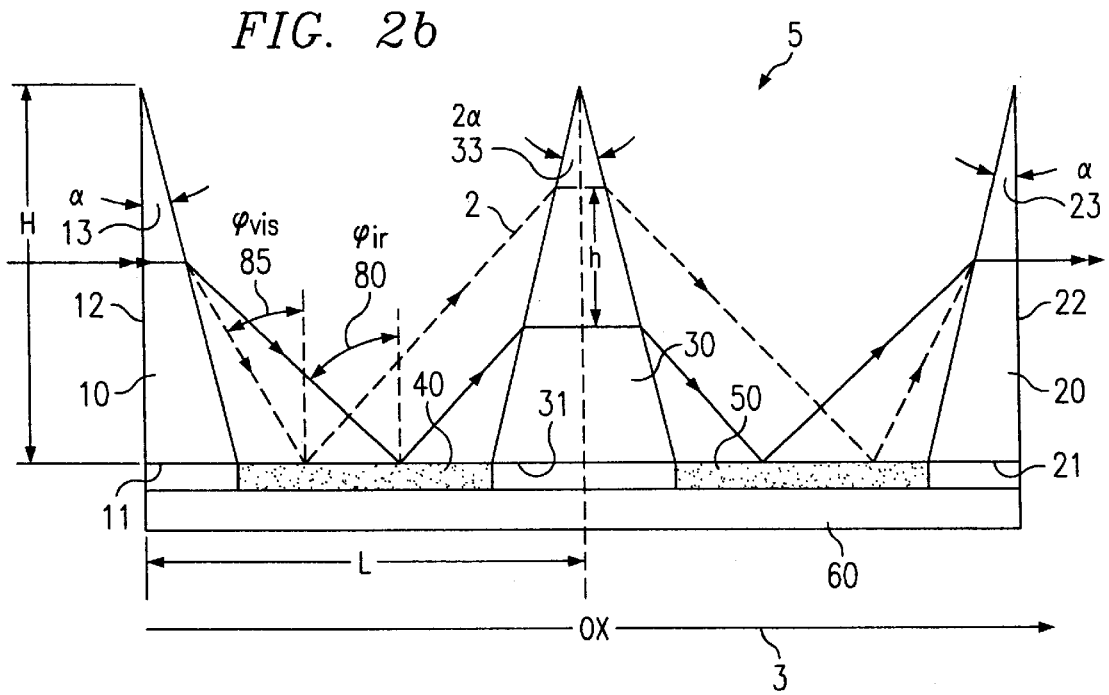

Referring to FIG. 2b, the height H of each prism 10, 20 and 30 typically ranges from about 10 mm to about 70 mm depending on the used laser beam diameter. As noted below, it is possible for prism 30 is somewhat higher than the other prisms 10 and 20. The height of the prisms and the top angles of the prisms determine the distance L between the prisms. Typically this distance is about two to three times larger than the height of the prisms 10–30.

FIG. 2b illustrates the optical device 5 of FIG. 2a in operation. Consider, as an example, the case where light with two wavelengths impinges upon the device 5. In this example, the incident light comprises a visible laser beam 2 and an invisible laser beam 1, both propagating along the optical axis OX (3). In this context, a visible beam is one that can be seen by an ordinary person and an invisible beam is one that cannot be seen by an ordinary person. The visible laser beam 2 is coincident with the invisible laser beam 1 for alignment reasons.

Due to the dispersion of the prism material both laser beams 1 and 2 refract under different angles $\phi_{vis}$ (85) and $\phi_{ir}$ (80). After reflecting on reflector 40 both laser beams 1 and 2 refract again on the inner prism 30. Due to the refractive index differences at different wavelengths the two beams are separated by a distance h within inner prism 30. After reflecting on the second reflector 50 and passing through the prism 20, this shift is completely compensated when the distance between prisms 10 and 30 and between prisms 30 and 20 are both equal to L. In this case both beams 1 and 2 leave the phase retarder 5 again coincident. This feature provides a real advantage of the device construction, namely, for all wavelengths the incoming and outgoing beams are completely coincident with or without the device in the setup. This zero displacement characteristics are extremely useful for aligning visible and invisible laser beams.

As a matter of illustration of the geometrical robustness some numerical results will be presented when the visible light beam stems from a HeNe laser ($\lambda_{vis}$=0.633 $\mu$m) and the invisible laser beam stems from a $CO_2$ laser ($\lambda_{IR}$=10.6 $\mu$m). In such case the prisms 10, 20 and 30 can be made from a zinc selenide (ZnSe) material, which is transparent over the considered wavelength region. Due to dispersion, the refractive index values of ZnSe for both wavelengths are different: $n_{vis}$=2.594 and $n_{IR}$=2.40272

Figure 3:
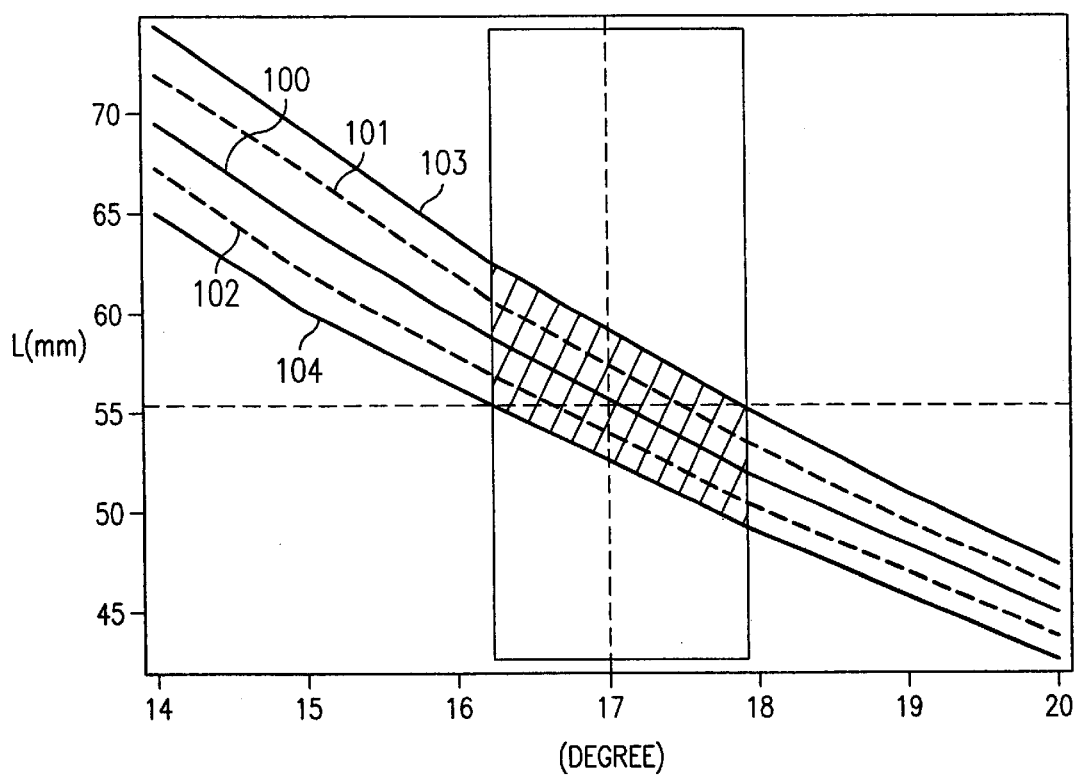

The height H of the outer prisms 10 and 20 imposes the distance L between the prisms. This dependence is illustrated in FIG. 3 by curve 100. Curve 100 is obtained by means of the following equation.

$$L = \frac{H}{\cos\alpha}\left[2\sin\alpha + \frac{\sqrt{1-n^2\sin^2\alpha}}{\sin\{\arcsin(n\cdot\sin\alpha)-\alpha\}}\right]$$

This curve 100 teaches that in the case where the prism upper angle is 17° (i.e., $\alpha$=17°), a full prism height H of 25 mm can be obtained when the prism spacing L is equal to 55 mm (i.e., L=55 mm). The curves 101 and 102 on one hand and 103 and 104 on the other hand teach us how the prism height of the device decreases to 24 and 23 mm respectively when the distance L between the prisms is not completely respected. Considering when $\alpha$=17° as an example, an axial misalignment range of the prisms of 6 mm will lead to an aperture decrease of only 2 mm.

The curves also illustrate the influence of the angle tolerance on the aperture size. The design curve shows that for $\alpha$=17° a tolerance of about ±1° is possible to keep the aperture within a value of 23 mm. In any case, this figure shows that the geometrical tolerances are quite relaxed. This means that the device can be fabricated with inexpensive alignment technology.

Figure 4:
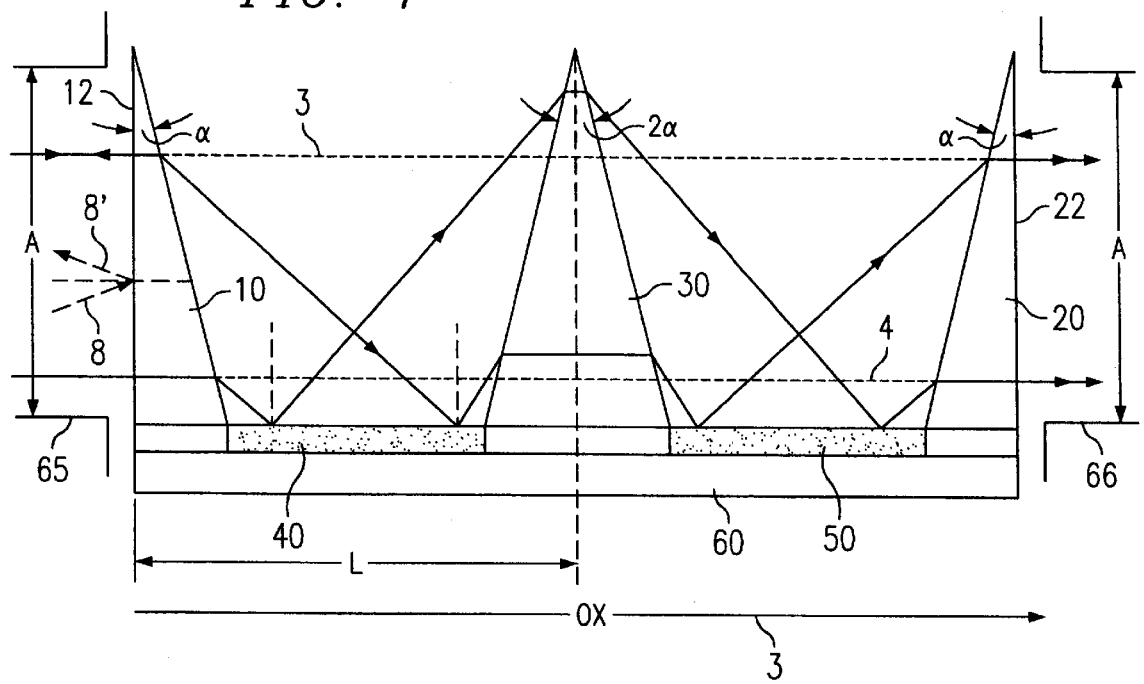
FIG. 4 schematically illustrates the absence of the optical axis and the self-aligning characteristics of the proposed phase retarder.

Due to the construction of this device, any lateral displacement of the device with respect to the beam has substantially no impact on the propagation path of the laser beams. This feature is illustrated in FIG. 4 by the propagation paths of beams 3 and 4. These beams can be incident on any place of the front surface 12 of prism 10 (or front surface 22 of prism 20) without noticing any influence of the phase retarder at the output on their propagation path. In other words, the device has no optical axis. This feature gives the device the advantage that it is insensitive to displacement vibrations. This advantage is especially useful in applications where the optical arrangement is situated in a harsh industrial environment.

This particular embodiment only requires that the incoming beam is incident within the incoming aperture 65 of the device and perpendicular to the surface 12 of outer prism 10. These requirements, however, are not very limiting since the device is self-aligning. The phase retarder can be easily aligned since the fraction of visible light reflected on the surface provides immediate information about the alignment of the device. In FIG. 4, the fact that misaligned beam 8 is not perpendicularly incident on the front surface can be immediately observed by the portion of visible light 8' reflected on this surface 12. The device can be visually adjusted such that the incident and reflected visible beams are coinciding, as is the case for beams 3 and 4. In that case, the outgoing beam leaves the device through the outgoing aperture 66.

Figure 5:
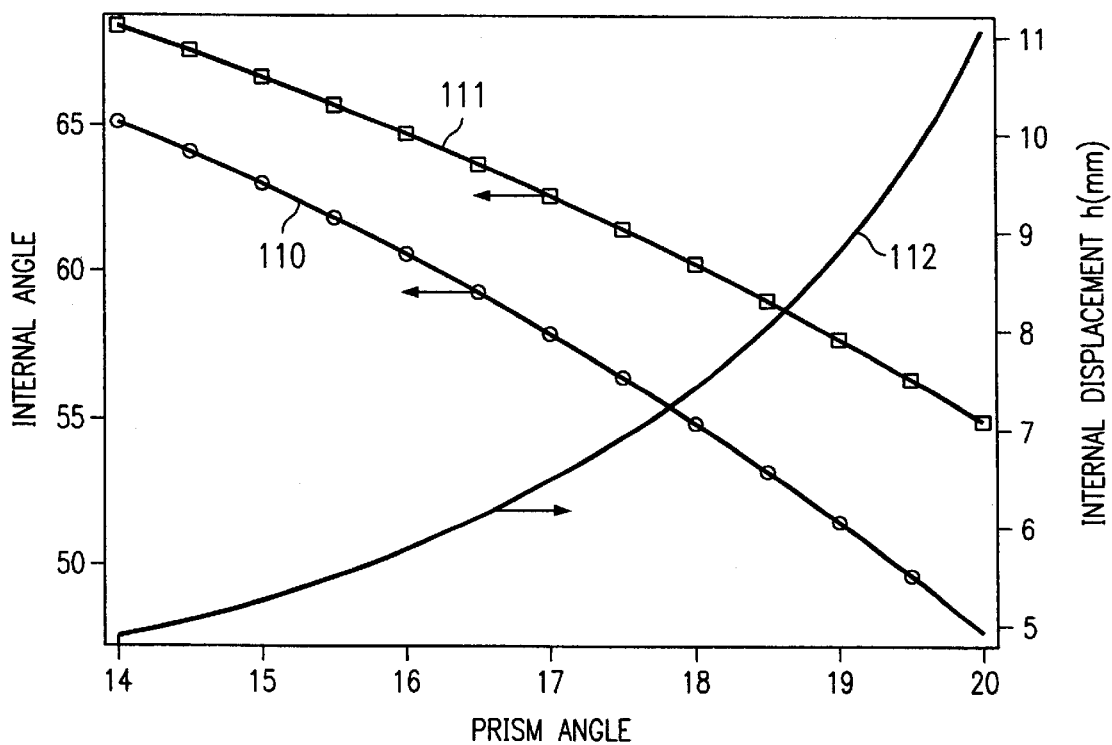
FIG. 5 shows the graph of the displacement between and the angles of the two laser beams inside the phase retarder.

Depending on the required phase change for the IR beam the phase coatings on the reflecting surfaces should be designed in accordance with the inner angle $\Psi_{IR}$, which depends on the prism angle $\alpha$ (12 and 22). The dependence of the internal angles $\phi_{ir}$ (80) and $\phi_{vis}$ (85) (as shown in FIG. 2b) on the prism angle a is shown by curves 110 and 111 of FIG. 5. The internal angle $\phi$ versus $\alpha$ for the design of the phase retarder is given by the following formula $$\phi = 90° + \alpha - \arcsin(n.\sin\alpha)$$

where n is the index of refraction and $\phi$ ($\phi_{ir}$ or $\phi_{vis}$) and $\alpha$ are the angles shown in FIG. 2b.

This internal angle difference between the two wavelengths (since n will vary for different wavelengths) has no influence of the operation principle of the device as long as the internal displacement (curve 112 of FIG. 5) between the two beams does not cause the visible beam to be out of the internal prism 30. For most applications, however, the visible beam width is much smaller than the invisible beam width such that displacements h up to half the apertures are possible (in the case of the simulation less than 12.5 mm).

Figure 6:
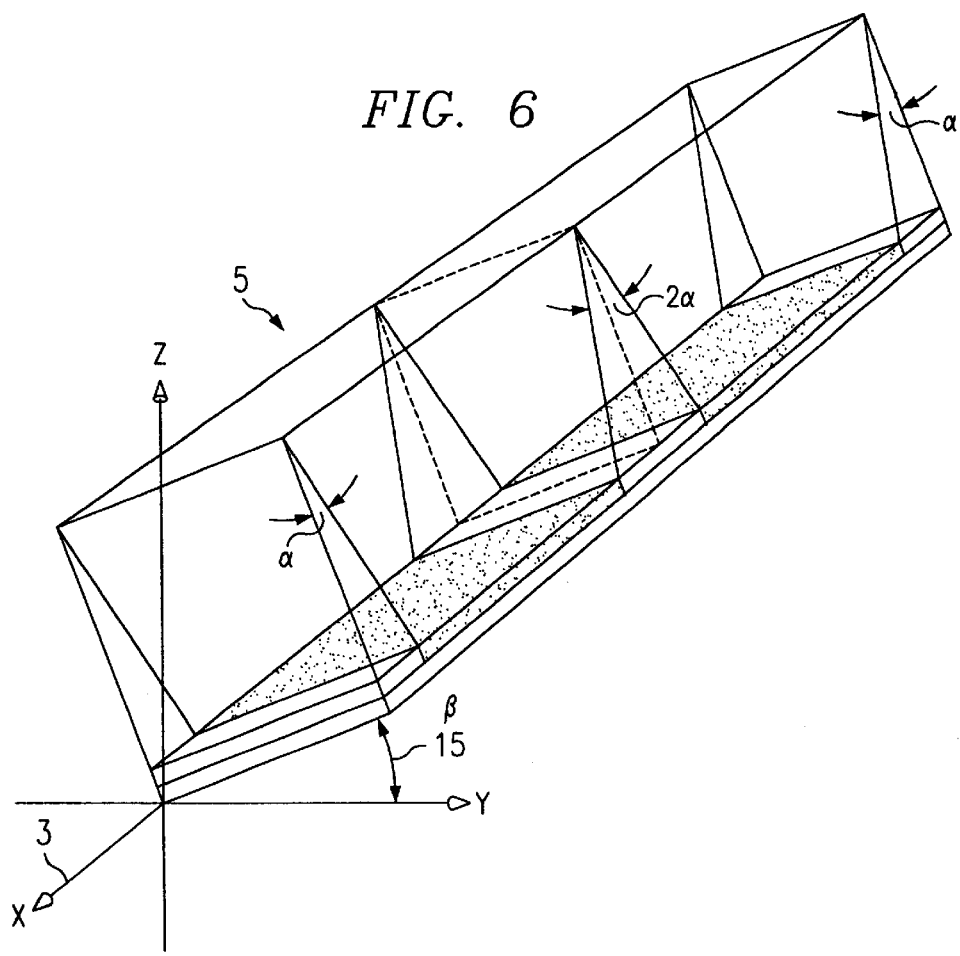
FIG. 6 show a three-dimensional view of a zero displacement phase retarder of the present invention.

In a typical application, linearly polarized light needs to be converted into circularly polarized light. This can be achieved by rotating the phase retarder under an angle β (15) with respect to the polarization state of the "invisible" laser beam. This technique is illustrated in FIG. 6.

Since the device comprises two phase changing surfaces 40 and 50, the designer has the freedom to set the phase changes of each reflector. In a symmetrical design both of them would introduce a 45°-phase shift for the same angle of incidence $\Psi_{IR}$. This is another advantage of the structure that the desired phase change can be synthesized in two steps. The wavelength dependence of the phase change depends on the wavelength dependence of the phase changing reflectors. In fact, any phase change can be implemented in the same device construction.

Figure 7:
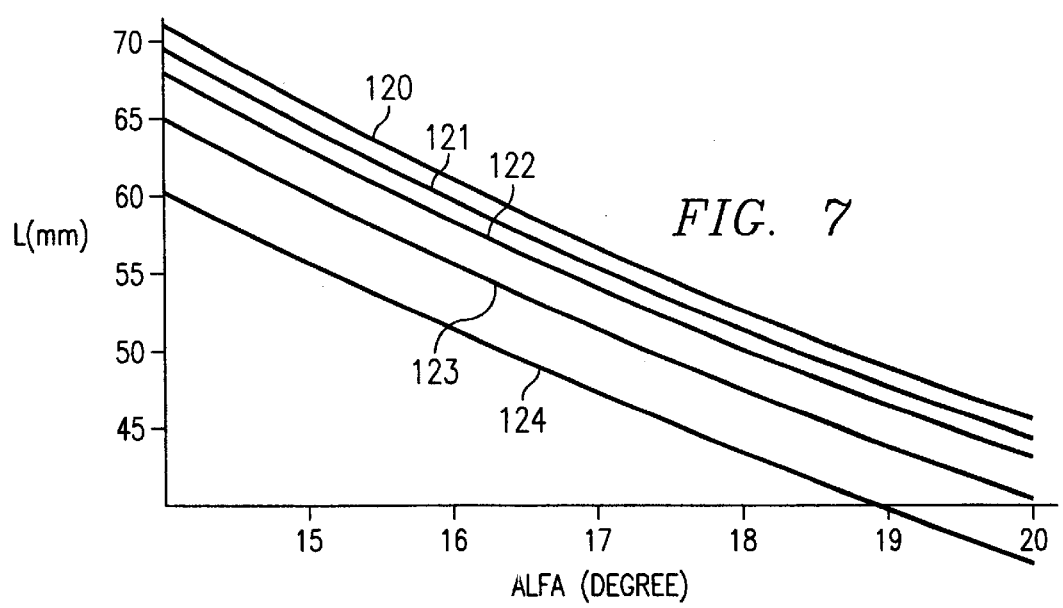
FIG. 7 shows wavelength dependent design plots.

For different wavelengths there exists an optimal prism distance L. Such wavelength dependent curves 120, 121, . . . , 124 are illustrated in FIG. 7. The following wavelengths are considered λ=0.633, 1, 5, 10.6, 14 μm. Curve 120 corresponds to the smallest wavelength. The optimal prism distance only influences the aperture size and not the propagation path through the phase retarder. This illustrates that the degree of achromaticity, i.e., wavelength independence, is only determined by the phase retarding reflectors 40, 50 and not by the geometrical constraints.

Figure 8:
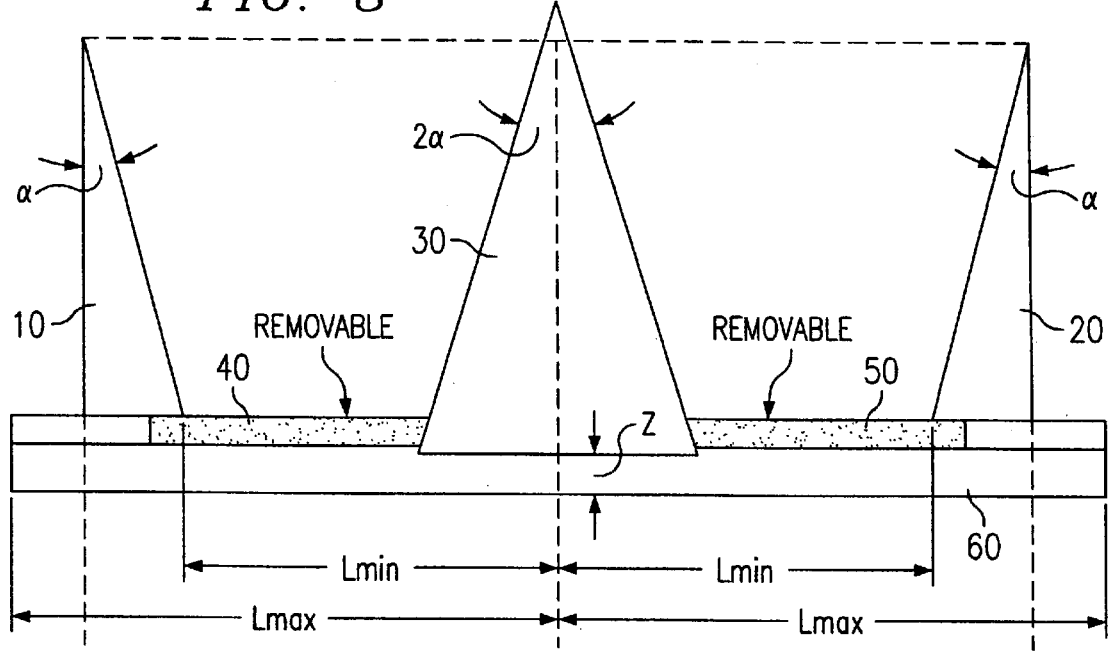
FIG. 8 shows a side view of a phase retarder with adjustable components.

All these intrinsic characteristics give higher functionality to the proposed device than other phase retarders. The device 5 can even be constructed such that the phase-shifting surfaces can be replaced when another functionality or other wavelength region is envisioned, such as illustrated in FIG. 8. With this device it is easy to switch between three basic polarization states of light by swapping the phase changing reflectors 40 and 50. Removing the phase retarder does not affect the polarization state. Once the phase retarder is inserted, the outgoing polarization state is determined by the sum of the reflecting phase changes. By motorized or manual swapping of the phase changing reflectors one can easily switch from 90 degrees (from linear to circular) towards 180 (linear to orthogonal linear) degrees phase shift. This means that these three basic polarization states can be obtained by simple mechanical movements, which do not disturb the propagation path of the two laser beams. If one wants to exploit the maximum aperture of the device over a broad wavelength range, fine mechanical adjustment of the prisms 10, 20 and 30 along the axis can be incorporated.

In another embodiment the height positioning of the central prism is feasible. The full aperture for the smallest wavelength can be kept when the inner prism is a little bit higher than the two outer prisms. It is preferred that the device is designed for the largest wavelength envisioned. When using still larger wavelengths than originally conceived, the device can still operate when the distances between the prisms can be slightly adapted. These features are also shown in FIG. 8.

The cross-section of the device can be as small as the beam diameter. The total length of the device depends on the prism angle. The most compact device can be designed for the largest angle α. However this angle needs to be smaller than a critical angle $\alpha_{tir}$ resulting in a condition of total internal reflection of the visible beam. Above this angle value the visible and invisible light beams are not any longer coinciding.

Figure 9:
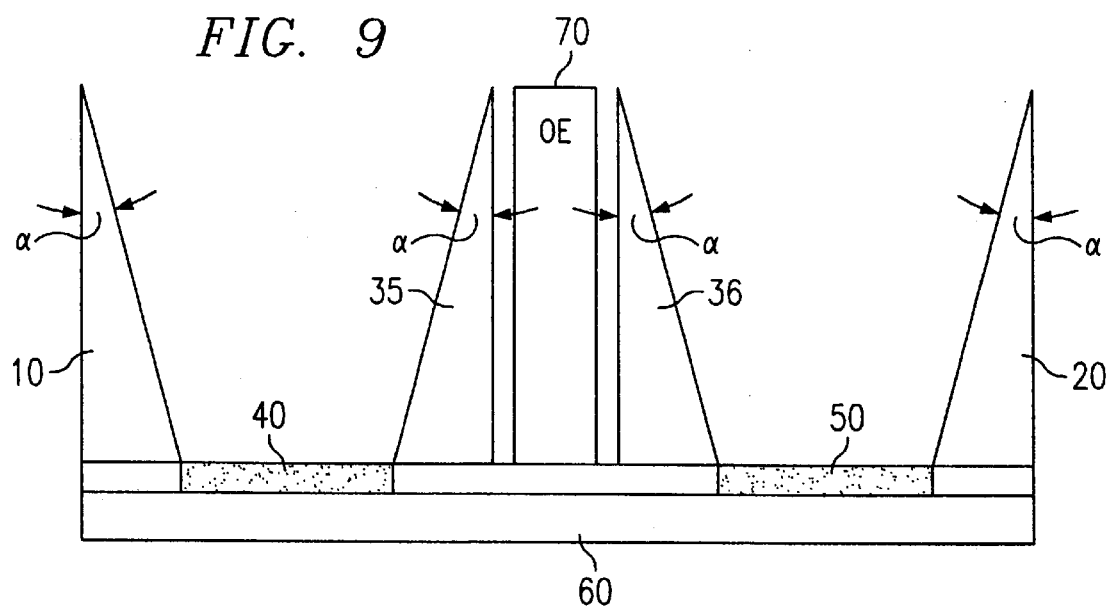
FIG. 9 shows a side view of a phase retarder where the central prism is implemented with two prisms.

In applications where a maximum transmission of the invisible light beam is required anti-reflection coatings are applied to the prisms. The construction of the device is such that if the transmission is not hypercritical, the same coating can be used for all the prism surfaces, which gives a technological advantage. In the case when this transmission is hypercritical different coatings can be used. A person skilled-in-the-art can easily adapt the design of the coatings to the different angles of incidence. In the case of a monolayer coating only the thickness changes for different angles. In another preferred embodiment the inner prism 30 can be split into two prisms 35 and 36 such that the whole construction consists of the same prisms. This embodiment is illustrated in FIG. 9. The splitting introduces two extra air/prism interfaces. When the coatings on the prism surfaces are very well designed the influence of these extra interfaces is minimal. The choice between the four and three prism arrangement is typically determined by the tradeoff between the production cost differences between one or two kinds of prisms and the allowable transmission losses.

In this embodiment, extra functionality can be added to the device. For example, one can insert an extra optical element 70 between the two inner prisms. This optical element should not induce any lateral shift of the two laser beams. The distances between the two inner prisms 35 and 36 is not of any importance as long as the laser beams are well collimated and do not become larger than the aperture of the device. Such optical element could induce an extra polarization change of the invisible laser beam.

The phase retarder of the present invention can be used in a number of applications. One such application, laser tooling, will be described now. Laser tooling can be used in material processing such as to cut, mark or engrave materials such as plastics, paper, textiles, wood, ceramic, leather, metals, or others. Since the phase retarder disclosed herein does not induce displacement, it can be useful in these applications.

Figure 10:
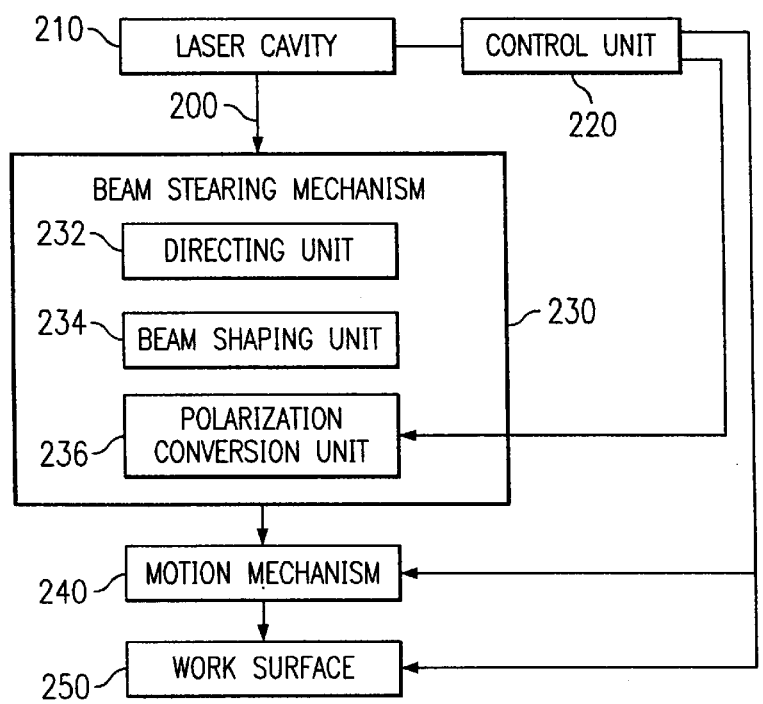
FIG. 10 is a functional graph of an industrial laser processing apparatus that includes a phase retarder of the present invention.

A general purpose laser processing tool configuration is shown in FIG. 10. A laser beam 200 is emitted by the laser 210, which is controlled by unit 220. Control unit 220 controls the parameters of the beam 200. Beam 200 is delivered to the work surface 250 via beam steering mechanism 230. Finally the motion unit 240 can be used to move the laser beam 200 across the material 250 or to move the material 250 under the laser beam 200 or any combination of both.

The functionality of the beam delivery system 230 can be subdivided into three portions: directing unit 232, beam shaping unit 234 and polarization control unit 236. The directing unit 232 typically comprises as set of mirrors assembled in articulated arms. The beam shaping unit 234 typically comprises a beam expander and a collimator in combination with focussing lenses to concentrate the optical power to a small spot size for a more efficient laser treatment.

Figure 11A:
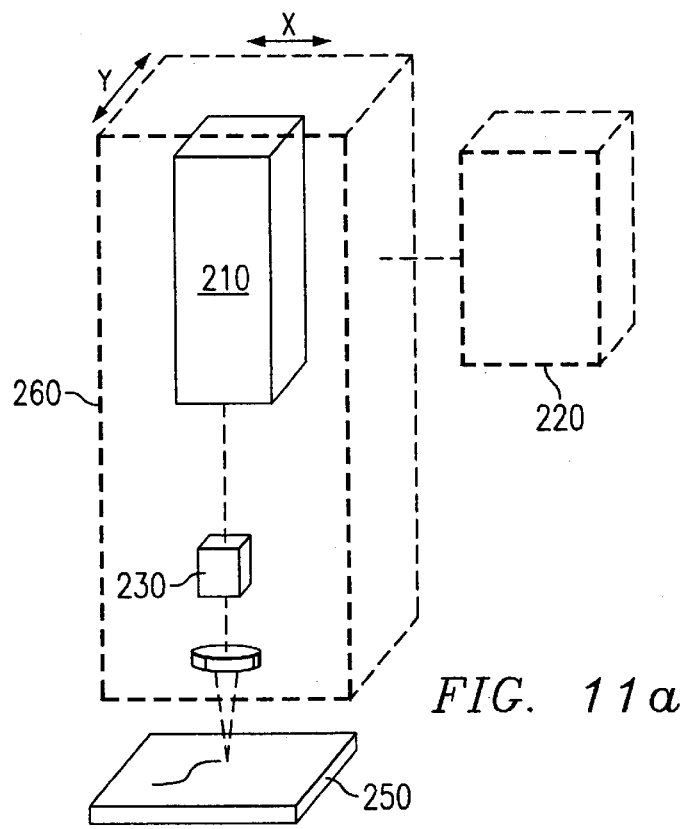
FIGS. 11a to 11c show a more detailed view of the industrial laser processing apparatus.
Figure 11B:
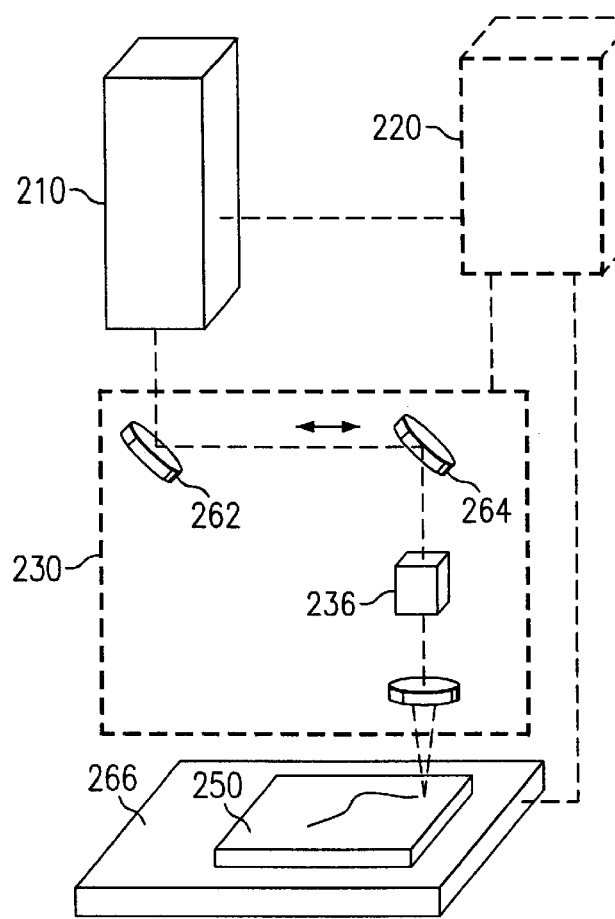
Figure 11C:
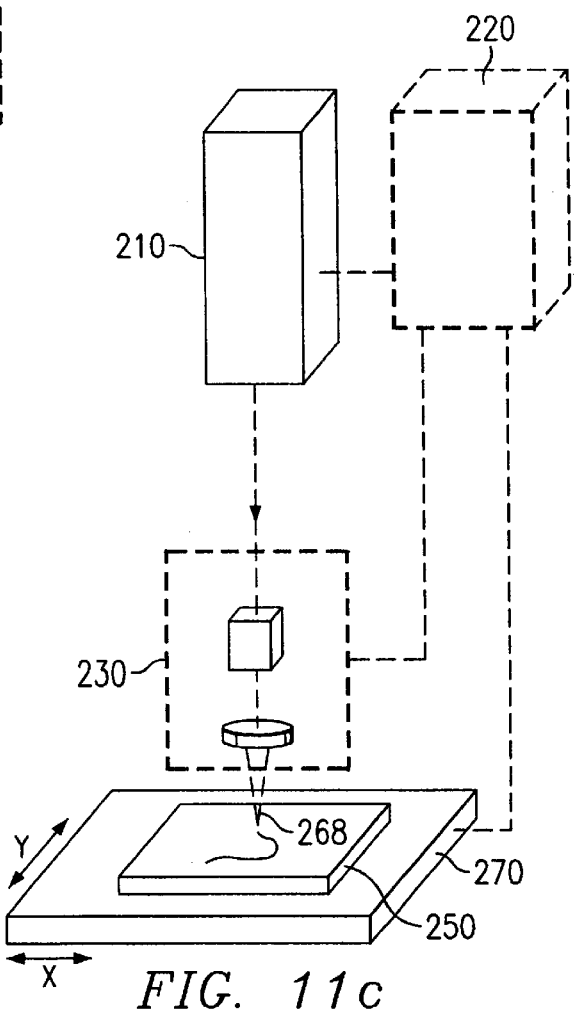

Referring now to FIGS. 11a–11c, the motion unit or motion mechanism 240 can be implemented in a number of ways. For example, the motion mechanism may include a gantry 260 (FIG. 11a) to support the beam steering mechanism 230 and allow it to move in one or two axes X and Y. Alternatively, or in addition, the motion unit can include flying optics in which moving mirrors 262, 264 (FIG. 11b) direct the beam over the material 250 to be processed. In this example the material might be stationary, i.e., the material 250 includes a stationary work surface 266. In yet another example, motion mechanism 240 can move the material to be processed beneath the fixed laser beam 268 (FIG. 11c).

For example, the motion mechanism 240 can be an XY table 270 which moves the material 250 in two axes X and Y beneath the beam 268.

In most laser tooling applications, it is very beneficial to convert from one linear polarized state of the light 200 into the orthogonal linearly polarization state for material processing in the orthogonal direction or into a circularly polarized state. This conversion provides a beam for high efficiency isotropic material processing. This goal can be efficiently achieved by using the described phase retarder in this setup. In other words, the phase retarders illustrated in FIGS. 2, 6, 8 or 9, or any of the variations or modifications described herein, could be used with the polarization conversion unit 236.

The preferred embodiment of the present invention provides a great advantage since the phase retarder can be brought into the setup without disturbing the propagation path of the laser beam. This propagation path can be quite complicated such that any perturbation by any component yields a misalignment. This advantage becomes increasingly beneficial in applications where the laser beam is switched between two orthogonal linearly and circularly polarized light. In those examples, polarization conversion unit 236 can be removed and reinserted without affecting the alignment of the remainder of the system. In fact, the present invention envisions an embodiment where polarization conversion unit 236 is automatically removed and reinserted by the system itself, e.g., via a motorized arm. This process could be performed in response to a control system, run for example on a computer or other processing unit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical device comprising:
    a substrate having an upper surface;
    a first prism disposed adjacent to the upper surface of the substrate, the first prism including a first surface extending away from the upper surface of the substrate;
    a second prism disposed adjacent to the upper surface of the substrate, the second prism spaced from the first prism by a first distance; and
    a third prism disposed adjacent to the upper surface of the substrate, the third prism spaced from the second prism by a second distance, the third prism including a first surface extending away from the upper surface of the substrate;
    the substrate having a reflective surface along the upper surface between the first prism and the second prism and between the second prism and the third prism.

2. The device of claim 1 wherein the upper surface of the substrate is coated with a multilayer coating at portions between the first prism and the second prism and between the second prism and the third prism.

3. The device of claim 1 wherein the upper surface of the substrate comprises a phase changing surface at portions between the first prism and the second prism and between the second prism and the third prism.

4. The device of claim 3 wherein the sum of the phase changes is equal to a desired total phase change for a particular wavelength of light impinging the device.

5. The device of claim 3 wherein the phase changing surfaces induce a set of different phase shifts up to a quasi-random set.

6. The device of claim 1 and further comprising an incoming beam aperture positioned adjacent to the first surface of the first prism and an outgoing beam aperture positioned adjacent to the first surface of the third prism.

7. The device of claim 1 wherein the first, second and third prisms are each formed from a material that is transparent for different wavelengths of light.

8. The device of claim 7 wherein the first, second and third prisms are each formed from a material that is transparent for both visible and infrared light.

9. The device of claim 8 wherein the first, second and third prisms are each formed from ZnSe.

10. The device of claim 1 wherein the first and third prisms each have a top angle between the first surface and a second surface extending from the upper surface of the substrate and wherein the top angles of first and third prisms are equal, the second prism also including a top angle that is twice the top angle of the first and third prisms.

11. The device of claim 1 wherein the first and third prisms are made from different materials.

12. The device of claim 1 wherein the second prism is taller than the first and third prisms.

13. The device of claim 1 wherein the first distance is the same as the second distance.

14. The device of claim 1 wherein the first surface of the first prism is perpendicular to substrate and the second surface of the third prism is also perpendicular to the substrate.

15. The device of claim 1 wherein the second prism comprises two separate prisms.

16. The device of claim 15 and further comprising an optical element located between two separate prisms.

17. The device of claim 1 wherein surfaces of the first, second and third prisms are coated with an antireflection coating.

18. A zero-displacement phase retarder device for keeping multi-color light beams aligned, the device comprising:
    a substrate supporting two surfaces spaced from one another, each of the surfaces reflecting light from the multi-color light beams, the surfaces being coated with a phase changing multilayer structure such that the sum of the phase changes for light from the multi-color light beams is equal to a desired total phase change for a particular wavelength of light; and
    first, second and third prisms of a selected optical material that is transparent for the different wavelength light in the multi-color light beams, the first and second prisms being substantially identical to one another and being placed at opposite ends of an upper surface of the substrate, the third prism being disposed on the upper surface of the substrate between the first and second prisms such that one of the two surfaces is between the first and third prisms and the other of the two surfaces is between the second and third prisms, the distance between the first and third prisms being substantially the same as the distance between the second and third prisms.

19. The device of claim 18 wherein the device includes an aperture positioned such that propagation of incoming light and outgoing light is substantially orthogonal to surfaces of first and second prisms.

20. The device of claim 18 wherein the selected optical material is transparent for visible light and also for infrared light.

21. The device of claim 20 wherein the selected optical material is ZnSe.

22. The device of claim 18 wherein the first, second and third prisms have equal height.

23. The device of claim 18 wherein the third prism is formed from two separate prisms.

24. The device of claim 23 wherein the first, second and two separate prisms comprise four substantially identical prisms.

25. The device of claim 23 and further comprising at least one additional optical element disposed between the two separate prisms.

26. A phase retarder device comprising:

a substrate having an upper surface;

a first prism having first and second surfaces extending upward from the upper surface of the substrate, the first surface extending at a substantially normal angle relative to the upper surface of the substrate, the second surface extending at a selected angle relative to the upper surface;

a second prism disposed adjacent to the upper surface of the substrate, the second prism having first and second surfaces extending upward from the upper surface of the substrate at the selected angle, the first surface of the second prism spaced from the second surface of the first prism by a first distance along the upper surface of the substrate;

a third prism disposed adjacent to the upper surface of the substrate, the third prism having first and second surfaces extending upward from the upper surface of the substrate, the first surface of the third prism spaced from the second surface of the second prism by the first distance along the upper surface of the substrate, the first surface extending at the selected angle relative to the upper surface, the second surface extending at a substantially normal angle relative to the upper surface of the substrate; and the substrate having a reflective surface along the upper surface between the first prism and the second prism and between the second prism and the third prism, wherein multi-wavelength light is transmitted through the first, second and third prisms, and wherein light with at least one wavelength undergoes a required phase shift upon impinging the reflective surfaces of the substrate.

27. A laser tooling apparatus comprising:

a laser cavity, the laser cavity including an optical output;

a beam steering device located adjacent the optical output of the laser cavity such that a laser beam emitted from the laser cavity enters the beam steering device, the beam steering device including a phase retarder, the phase retarder comprising:

a substrate supporting two surfaces spaced from one another, each of the surfaces reflecting light from the laser beam, the surfaces being coated with a phase changing multilayer structure such that the sum of the phase changes for light from multi-color light beams is equal to a desired total phase change for a particular wavelength of light; and first, second and third prisms of a selected optical material that is transparent for the light of the laser beam, the first and second prisms being substantially identical to one another and being placed at opposite ends of an upper surface of the substrate, the third prism being disposed on the upper surface of the substrate between the first and second prisms such that one of the two surfaces is between the first and third prisms and the other of the two surfaces is between the second and third prisms, the distance between the first and third prisms being substantially the same as the distance between the second and third prisms.

28. The apparatus of claim 27 and further comprising a motion mechanism located adjacent to the beam steering device so as to receive the laser beam from the beam steering device, the motion mechanism to move the laser beam across a material to be processed.

29. The apparatus of claim 28 wherein the motion mechanism comprises a gantry, whereon the laser cavity and beam steering mechanism is supported and that can move in one or two axes.

30. The apparatus of claim 28 wherein the motion mechanism comprises flying optics in which moving mirrors direct the laser beam over the material to be processed, the material including a stationary work surface.

31. The apparatus of claim 27 and further comprising a motion mechanism to move the material to be processed beneath a fixed laser beam.

32. The apparatus of claim 31 wherein the motion mechanism comprises an xy table which moves the material in two axes beneath the laser beam.

33. The apparatus of claim 27 and further comprising a motion mechanism located adjacent to the beam steering device so as to receive the laser beam from the beam steering device, the motion mechanism to move the laser beam across the material to be processed, the motion mechanism comprising flying optics in which moving mirrors direct the laser beam over a stationary work surface of the material to be processed.

34. The apparatus of claim 27 and further comprising a motion mechanism to cause at least one of the laser beam and the material to be process to be moved relative to the other, wherein the beam steering device further comprises a directing unit and a beam shaping unit.

* * * * *